United States Patent
Nokita

(10) Patent No.: US 8,670,040 B2
(45) Date of Patent: Mar. 11, 2014

(54) IMAGE PROCESSING METHOD AND APPARATUS AND X-RAY IMAGING APPARATUS IMPLEMENTING IMAGE SHARPENING PROCESSING

(75) Inventor: Makoto Nokita, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1217 days.

(21) Appl. No.: 10/857,816

(22) Filed: Jun. 1, 2004

(65) Prior Publication Data

US 2004/0246347 A1 Dec. 9, 2004

(30) Foreign Application Priority Data

Jun. 9, 2003 (JP) .................... 2003-164084

(51) Int. Cl.
*H04N 5/228* (2006.01)
*H04N 5/235* (2006.01)
*G06K 9/00* (2006.01)
*G06K 9/40* (2006.01)
*H04N 1/21* (2006.01)
*H04N 1/23* (2006.01)

(52) U.S. Cl.
USPC ........ 348/222.1; 382/132; 382/260; 382/266; 382/275; 358/302; 348/229.1

(58) Field of Classification Search
USPC .............. 348/222.1–261; 382/132, 254–275; 358/302
See application file for complete search history.

(56) References Cited

U.S. PATENT DOCUMENTS

| | | | |
|---|---|---|---|
| 4,769,757 A | | 9/1988 | Horiba et al. |
| 5,412,705 A | * | 5/1995 | Snoeren et al. ............ 378/98.3 |
| 5,600,574 A | * | 2/1997 | Reitan ........................ 702/185 |
| 5,696,850 A | * | 12/1997 | Parulski et al. ............. 382/261 |
| 5,715,334 A | * | 2/1998 | Peters ......................... 382/254 |
| 5,832,055 A | * | 11/1998 | Dewaele ....................... 378/62 |
| 5,981,968 A | * | 11/1999 | Nakazawa .................. 250/587 |
| 6,057,889 A | * | 5/2000 | Reitmeier et al. ........... 348/555 |
| 6,205,198 B1 | * | 3/2001 | Garland et al. ............. 378/98.7 |
| 6,296,387 B1 | * | 10/2001 | Guillemaud ................ 378/207 |
| 6,392,249 B1 | * | 5/2002 | Struye et al. ................ 250/585 |
| 6,628,329 B1 | * | 9/2003 | Kelly et al. ................. 348/252 |
| 6,707,057 B2 | * | 3/2004 | Cresens et al. .............. 250/581 |
| 6,724,941 B1 | * | 4/2004 | Aoyama ..................... 382/254 |
| 7,385,217 B2 | * | 6/2008 | Tezuka ........................ 250/586 |

(Continued)

FOREIGN PATENT DOCUMENTS

| | | |
|---|---|---|
| JP | 8-116044 A | 5/1996 |
| KR | 0025231 | 2/1988 |

OTHER PUBLICATIONS

M. Lissak Giger & K. Doi, "Investigation of basic Imaging properties in digital radiography", Med. Phys. 11(3), pp. 287-295, May/Jun. 1984.

(Continued)

*Primary Examiner* — Chia-Wei A Chen
(74) *Attorney, Agent, or Firm* — Cowan, Liebowitz & Latman, P.C.

(57) ABSTRACT

In an image processing method of processing an image obtained from an image sensor, the resolution distribution of the image sensor is held in a memory, and a resolution corresponding to a pixel of interest of the image is acquired from the resolution distribution of the image sensor which is held in the memory. Sharpening processing having the sharpening level selected on the basis of the acquired resolution is executed for the pixel of interest.

17 Claims, 11 Drawing Sheets

(56) References Cited

U.S. PATENT DOCUMENTS

| | | | |
|---|---|---|---|
| 2002/0106054 A1* | 8/2002 | Caflisch et al. | 378/65 |
| 2002/0106123 A1* | 8/2002 | Inoue | 382/168 |
| 2002/0159633 A1* | 10/2002 | Inoue | 382/170 |
| 2003/0076922 A1* | 4/2003 | Wischmann et al. | 378/19 |
| 2003/0123617 A1* | 7/2003 | Nagatsuka | 378/210 |
| 2003/0138742 A1* | 7/2003 | Irie et al. | 430/396 |
| 2003/0168635 A1* | 9/2003 | Hampden-Smith et al. | 252/301.4 R |
| 2003/0190068 A1* | 10/2003 | Yasuda | 382/132 |
| 2004/0028286 A1* | 2/2004 | Saigusa et al. | 382/264 |
| 2004/0032622 A1* | 2/2004 | Tezuka | 358/302 |
| 2004/0036407 A1* | 2/2004 | Jin | 313/495 |
| 2004/0081273 A1* | 4/2004 | Ning | 378/37 |
| 2004/0104376 A1* | 6/2004 | Maezawa et al. | 252/301.4 H |
| 2004/0150311 A1* | 8/2004 | Jin | 313/309 |
| 2004/0169474 A1* | 9/2004 | Hampden-Smith et al. | 313/582 |
| 2006/0029274 A1* | 2/2006 | Inoue | 382/170 |
| 2007/0160285 A1* | 7/2007 | Gondek et al. | 382/162 |
| 2009/0122116 A1* | 5/2009 | Silverbrook | 347/61 |

OTHER PUBLICATIONS

Hatagawa et al., "Study on MTF Measurement in Digital System Using Rectangular Wave Chart", Japanese Journal of Radiological Technology, vol. 53, No. 11, pp. 1683-1690, Nov. 1997.

Takagi et al., Latest Trend of Image Processing Algorithm, New Technology Communications, pp. 33-41, Nov. 1986 (partial translation pp. 1-3).

Kak Rosenfeld, "Digital Picture Processing", pp. 185-198, 1982.

Fujita et al., Investigation of basic imaging properties in digital radiography, Med. Phys. 12(6), pp. 713-720, Am. Assoc. Phys. Med., 1985.

Brix et al., "Use of scanner characteristics in iterative image reconstruction for high-resolution positron emission tomography studies of small animals", European Journal of Nuclear Medicine, Berlin, DE, vol. 24, No. 7, Jul. 1997, pp. 779-786, XP00318420.

Bergstrom et al., "Correction for Scattered Radiation in a Ring Detector Positron Camera by Integral Transformation of the Projections", Journal of Computer Assisted Tomography USA, vol. 7, No. 1, Feb. 1983, pp. 42-50, XP009052384.

Seibert et al., "X-ray scatter removal by deconvolution", Medical Physics USA, vol. 15, No. 4, Jul. 1988, pp. 567-575, XP002340970.

Boone et al., "An analytical model of the scattered radiation distribution in diagnostic radiology", Medical Physics, American Institute of Physics. New York, USA, vol. 15, No. 5, Sep. 1988, pp. 721-725), XP000007100.

Communication with European Search Report dated Aug. 30, 2005.

Andrew Shearer, Gerard Gorman, Triona O'Doherty, Wil van der Putten, Peter McCarthy and Lukasz Jelen, "Parallel Image Restoration with Spatially Variant Point-Spread-Function—Description and first Clinical Results" Proceedings of the SPIE, vol. 4322, 2001, pp. 787-795, XP007907686 San Diego, CA, USA.

P Abbott; A Shearer; T O'Doherty; W Van Der Putten: "Image Deconvolution as an Aid to Mammographic artefact Identification. I. Basic Techniques" Proceedings of the SPIE, vol. 3661, Feb. 1999, pp. 698-709, XP007907743 San Diego, CA USA.

Mar. 25, 2009 European Office Action of the counterpart European Patent Application No. 04013490.0.

Perry, Stuart William: "Adaptive Image Processing" 2002, CRC Press ISBN: 9780849302831 pp. 44-45.

Sep. 2, 2010 European Office Action, that issued in European Patent Application No. 04013490.0.

* cited by examiner

| I(x−1,y−1) | I(x−1,y+0) | I(x−1,y+1) |
| --- | --- | --- |
| I(x+0,y−1) | I(x+0,y+0) | I(x+0,y+1) |
| I(x+1,y−1) | I(x+1,y+0) | I(x+1,y+1) |

\*

| a(−1,−1) | a(−1,0) | a(−1,1) |
| --- | --- | --- |
| a(0,−1) | a(0,0) | a(0,1) |
| a(1,−1) | a(1,0) | a(1,1) |

FREQUENCY CHARACTERISTICS

IMAGE PROCESSING METHOD AND APPARATUS AND X-RAY IMAGING APPARATUS IMPLEMENTING IMAGE SHARPENING PROCESSING

FIELD OF THE INVENTION

The present invention relates to an image processing method and apparatus and an X-ray imaging apparatus which are suitable for digital X-ray images and, more particularly, to sharpening processing for digital X-ray images.

BACKGROUND OF THE INVENTION

In X-ray imaging, a film/screen system (F/S) having a film and intensifying screen inserted in a cassette has been conventionally used as an X-ray sensor which acquires an X-ray image of a subject to be examined.

Recently, an X-ray sensor has been proposed, which can directly convert an X-ray image into a digital output in real time. For example, there is available an X-ray detector formed by stacking a solid-state photodetector and a phosphor on a substrate made of quartz glass with an amorphous semiconductor being sandwiched between them. The solid-state photodetector is formed by arranging solid-state photodetecting elements, each comprised of a transparent conductive film and conductive film, in the form of a matrix. The phosphor converts X-rays into visible light. In the acquisition process for a digital X-ray image using this X-ray detector, when the X-ray detector is irradiated with X-rays transmitted through a target, the X-rays are converted into visible light by the phosphor, and the visible light is detected as an electrical signal by the photoelectric conversion portion of each solid-state photodetecting element. The electrical signal obtained in this manner is read out from each solid-state photodetecting element by a predetermined read method, and is A/D-converted, thereby obtaining an X-ray image signal. The above X-ray detector is disclosed in detail in Japanese Patent Laid-Open No. 8-116044. Many X-ray detectors have also been proposed, which are designed to directly acquire X-rays through a solid-state photodetector without using any phosphor. In addition, there have been proposed many X-ray detectors designed to acquire a digital X-ray image by irradiating a storage phosphor, which is a special phosphor, with an X-ray signal, causing optically stimulated luminescence using a laser, and detecting optically stimulated luminescence light through each photodetecting element.

Phosphor plates using phosphors which are used in X-ray detectors include a phosphor plate formed by using a powder phosphor and a phosphor plate formed by crystal-growing a phosphor into a needle shape. In general, as a phosphor increases in thickness (mass thickness or the like), the X-ray absorption efficiency increases, but the resolution deteriorates. If a phosphor is crystallized into a needle shape, light emitted inside the phosphor is transmitted to the solid-state detector through a needle-like crystal serving like an optical fiber. Even if therefore, the phosphor increases in thickness, the resolution deteriorates less. Therefore, a phosphor plate formed by crystal-growing a phosphor into a needle shape is characterized in that it has high X-ray absorption efficiency and high resolution.

When a phosphor plate is to be formed by coating with a powder phosphor, a large-area phosphor plate without performance unevenness can be formed at low cost. In contrast to this, when a phosphor plate is to be formed by crystal-growing a phosphor into a needle shape, the phosphor must be grown into a needle shape by vacuum evaporation. It is difficult in terms of manufacturing techniques to form a large-area phosphor plate without performance unevenness at low cost. The presence of performance unevenness in an X-ray detector will adversely affect image quality. One of such performance unevenness, in particular, is a resolution distribution in which different resolutions appear at different positions on the phosphor plate. This resolution distribution leads to different sharpnesses of image quality on the central portion and periphery, and hence is undesirable in terms of X-ray image diagnosis.

FIGS. 11A and 11B are views for explaining the resolution distribution of the above X-ray detector, and more specifically, graphs showing presampling MTFs indicating the resolutions of the X-ray detector. For presampling MTF (Modulation Transfer Function), see Med. Phys., 11(3), 287-295, 1984, and Hatagawa et al., "Study on MTF Measurement in Digital System Using Rectangular Wave Chart", Japanese Journal of Radiological Technology, Vol. 53, No. 11.

FIG. 11A shows the resolutions near the center and end portion of the X-ray detector. The abscissa represents the spatial frequency (unit: lp/mm: the abscissa representing the number of pairs of white and black lines existing within 1 mm); and the ordinate, the presampling MTF. The solid curve represents the resolution near the center of the X-ray detector. The broken curve represents the resolution near an end portion of the X-ray detector. The resolution distribution of the X-ray detector shown in FIG. 11A indicates that the resolution at the center is superior to the resolution at the end portion in each spatial frequency band.

FIG. 11B shows the distribution of resolutions from near the center of the X-ray detector to near the end portion. The abscissa represents the distance from the center of the X-ray detector (if the X-ray detection surface of the X-ray detector is rectangular, the center indicates the intersection of diagonals of the rectangle); and the ordinate, the presampling MTF. Each data sequence indicates the values of presampling MTFs at spatial frequencies at intervals of 1.0 lp/mm. As is obvious from the graph of FIG. 11B, the presampling MTF gradually changes from near the center, and the presampling MTF near the center is superior to that at the end portion throughout all the spatial frequencies.

As is understood from the case shown in FIGS. 11A and 11B, the resolution of the X-ray detector changes from the center of the X-ray detector concentrically in accordance with changes in radius. When a phosphor Plate is to be formed by crystal growth, a phosphor must be crystal-grown by vacuum evaporation. The uniformity of a performance distribution greatly depends on the size of an evaporation furnace. As the size of an evaporation furnace increases, the price of a phosphor increases. In practice, therefore, it is difficult to form a large-area phosphor plate without performance unevenness.

On the other hand, doctors who diagnose X-ray images have seen many X-ray images, and hence are sensitive to changes in the image quality of X-ray images. Therefore, improvements must be done to changes in resolution like those shown in FIGS. 11A and 11B.

SUMMARY OF THE INVENTION

The present invention has been made in consideration of the above problems, and has as its object to effectively improve the image quality of an image obtained from an image sensor having a resolution distribution.

In order to achieve the above object, according to one aspect of the present invention, there is provided an image processing method of processing an image obtained from an image sensor, comprising: a first acquisition step of acquiring a resolution corresponding to a pixel of interest of the image from a resolution distribution of the image sensor which is held in a memory; and a sharpening step of executing sharpening processing at a sharpening level selected on the basis of the acquired resolution for the pixel of interest.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

In the first embodiment, an X-ray imaging apparatus which improves the resolution distribution of an X-ray detector will be described.

Figure 1:
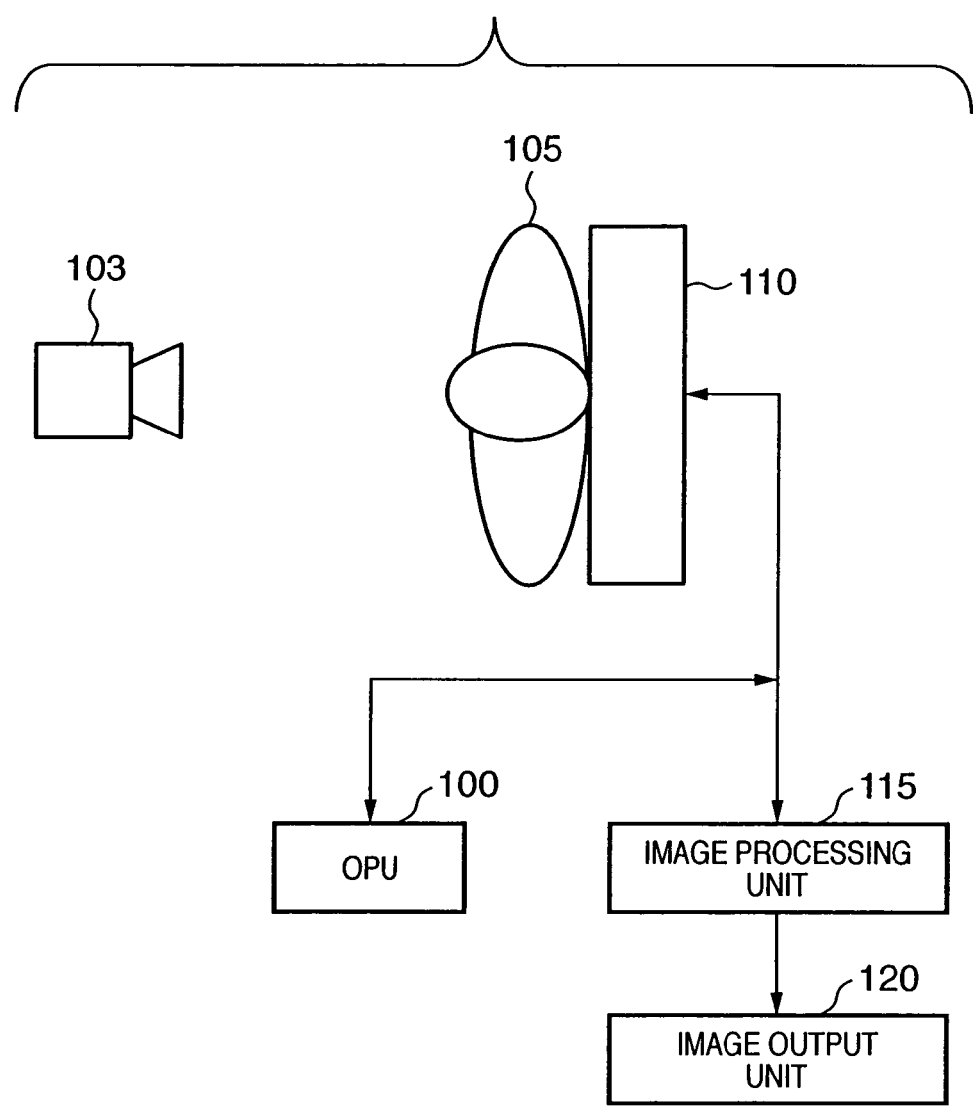
FIG. 1 is a view schematically showing the arrangement of a preferred example of an X-ray imaging apparatus according to the first embodiment.

FIG. 1 is a schematic view showing a preferred example of the X-ray imaging apparatus according to the first embodiment. Referring to FIG. 1, reference numeral 100 denotes an OPU (operation unit); 103, an X-ray source; 105, a subject to be imaged; 110, an X-ray detector; 115, an image processing unit; and 120, an image output unit.

First of all, an operator inputs X-ray imaging region information by using the OPU 100. The X-ray imaging region information includes a region of the subject which is to be imaged, X-ray imaging conditions, and the like. When the X-ray imaging region information is input, the X-ray detector 110 is ready for imaging. When the technician checks the imaging ready state of the X-ray detector 110 and gives an instruction to start imaging, the X-ray source 103 emits X-rays. The emitted X-rays are transmitted through the subject 105 and incident on the X-ray detector 110. The incident X-rays are detected by the X-ray detector 110. As a consequence, an X-ray image of the subject 105 is acquired as a digital X-ray image.

The acquired digital X-ray image is subjected to the processing of correcting pixel variations of the X-ray detector 110 by the image processing unit 115, the processing of adjusting the dynamic range of the digital X-ray image, sharpening processing for the digital X-ray image, gradation processing, and the like. The image output unit 120 is preferably comprised of a monitor which displays a digital X-ray image, a printer which outputs a digital X-ray image onto a film or the like, a storage server which stores a digital X-ray image, and the like. The digital X-ray image processed by the image processing unit 115 is sent to the image output unit 120 to be displayed on the monitor. If necessary, the digital X-ray image is output from the printer onto a film to be used for diagnosis on the subject. The digital X-ray image is stored in the storage server or the like for the next diagnosis or the like.

Figure 2:
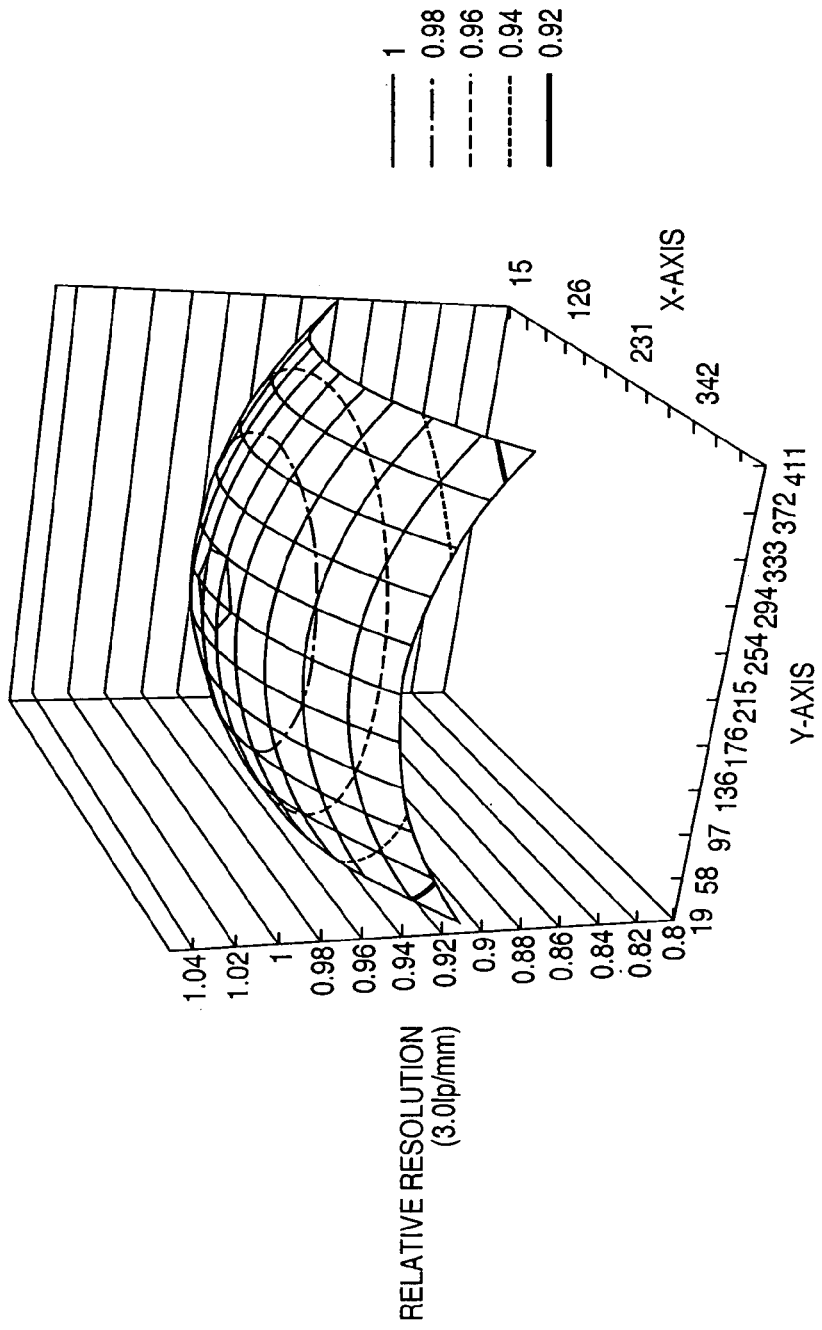
FIG. 2 is a view for explaining an example of the resolution distribution data of an X-ray detector described with reference to FIG. 1.

FIG. 2 is a view showing resolution distribution data as an index indicating the resolution distribution of the X-ray detector 110. Resolution distribution data is an index indicating a resolution at a given position (represented by X- and Y-coordinates in FIG. 2) on the X-ray detector 110. Any data can be used as long as a resolution at a given position can be known from the numerical value of resolution distribution data at the given position. For example, as shown in FIG. 11B, resolution distribution data can be generated by using presampling MTFs corresponding to resolutions at a plurality of positions on the X-ray detection surface of the X-ray detector 110.

For example, resolution distribution data like that shown in FIG. 2 can be generated by expressing a position on the X-ray detection surface of the X-ray detector 110 by X- and Y-axes, and substituting a presampling MTF value at a spatial frequency of 3.0 lp/mm for a resolution at the position. The process of performing sharpening processing by using resolution distribution data will be described below.

Figure 3:
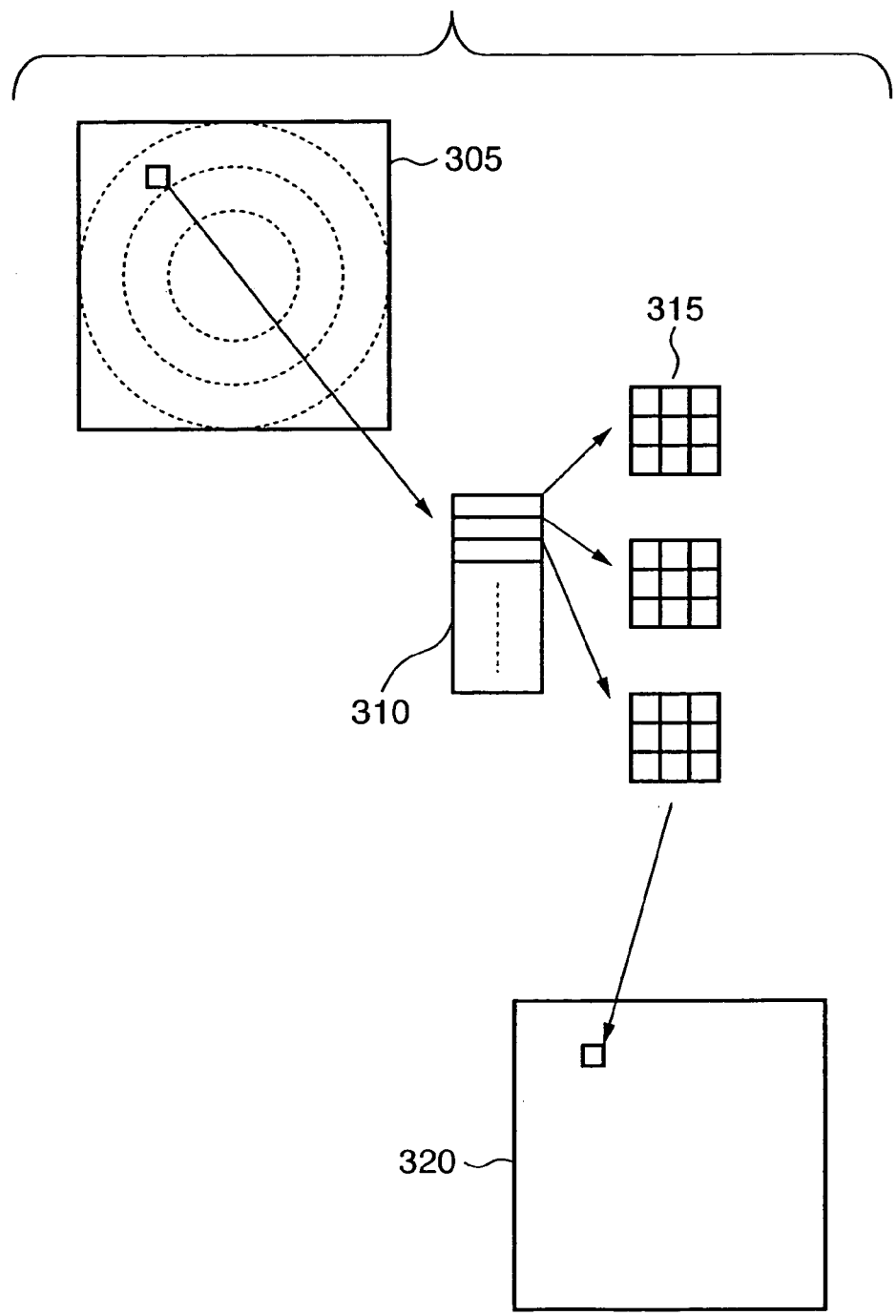
FIG. 3 is a view for explaining sharpening processing according to the first embodiment, which improves a resolution distribution.
Figure 11A:
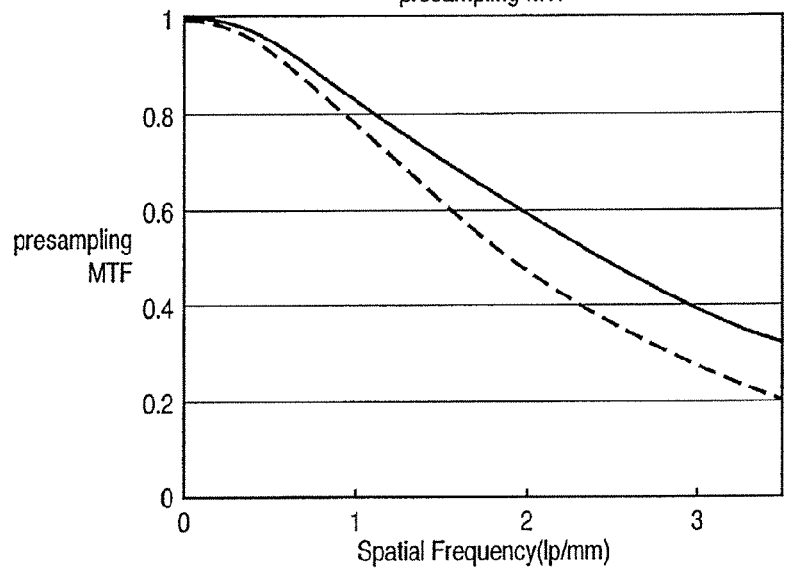
FIGS. 11A and 11B are graphs for explaining examples of resolution distributions in the X-ray detector, which pose problems in the present invention.
Figure 11B:
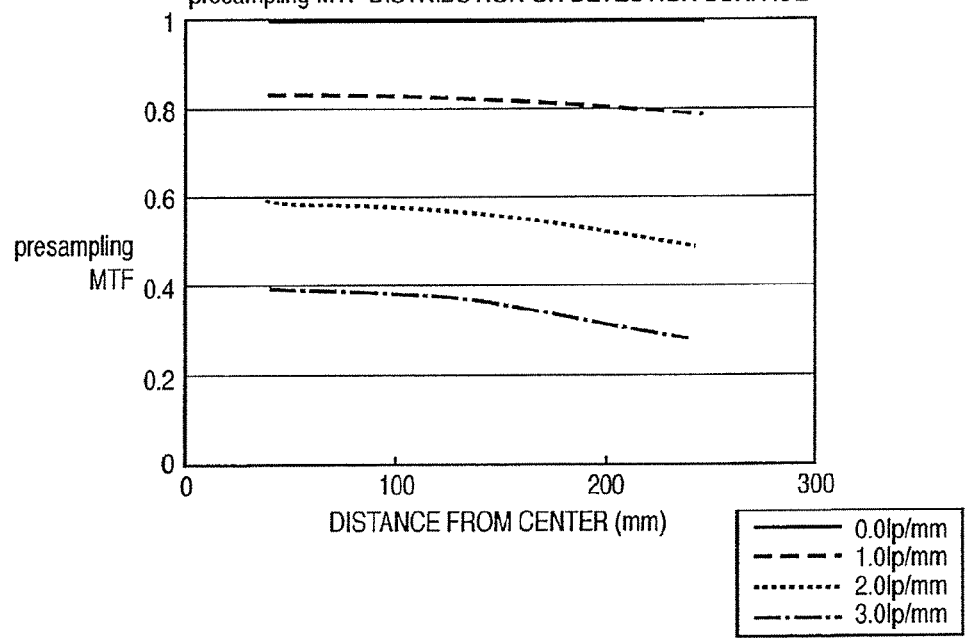

FIG. 3 is a view for explaining sharpening processing in the first embodiment which improves the resolution distribution shown in FIG. 2 or 11B. Referring to FIG. 3, reference numeral 305 denotes resolution distribution data; 310, a spatial filter table; 315, a spatial filter; and 320, an original image.

The resolution distribution data 305 is data representing the relationship between a pixel position on the image and an index of resolution. As in the case shown in FIG. 2, the resolution of the X-ray detector 110 changes concentrically. Note that an index of resolution may be an index that continuously changes like the presampling MTF shown in FIG. 11B, or discrete indexes defined by concentric regions like those shown in FIG. 3.

When a pixel position is determined on the X-ray image, a pixel position on the resolution distribution data 305 is determined, and an index of resolution corresponding to the pixel position is determined. The spatial filter 315 is then selected from the spatial filter table 310 on the basis of the determined index of resolution. In this case, in the spatial filter table 310, spatial filters are associated with indexes of resolution such that a spatial filter with a low enhancement degree is selected as the spatial filter 315 at a pixel position where the resolution is high on the X-ray image, and a spatial filter with a high enhancement degree is as the spatial filter 315 at a pixel position where the resolution is low.

By applying the spatial filter selected in this manner to the original image 320, filtering processing is performed. Performing this operation at all pixel positions on the X-ray image can improve the resolution distribution on the X-ray detector, thereby obtaining a digital X-ray image without any sense of discomfort in terms of diagnosis.

Second Embodiment

Figure 4:
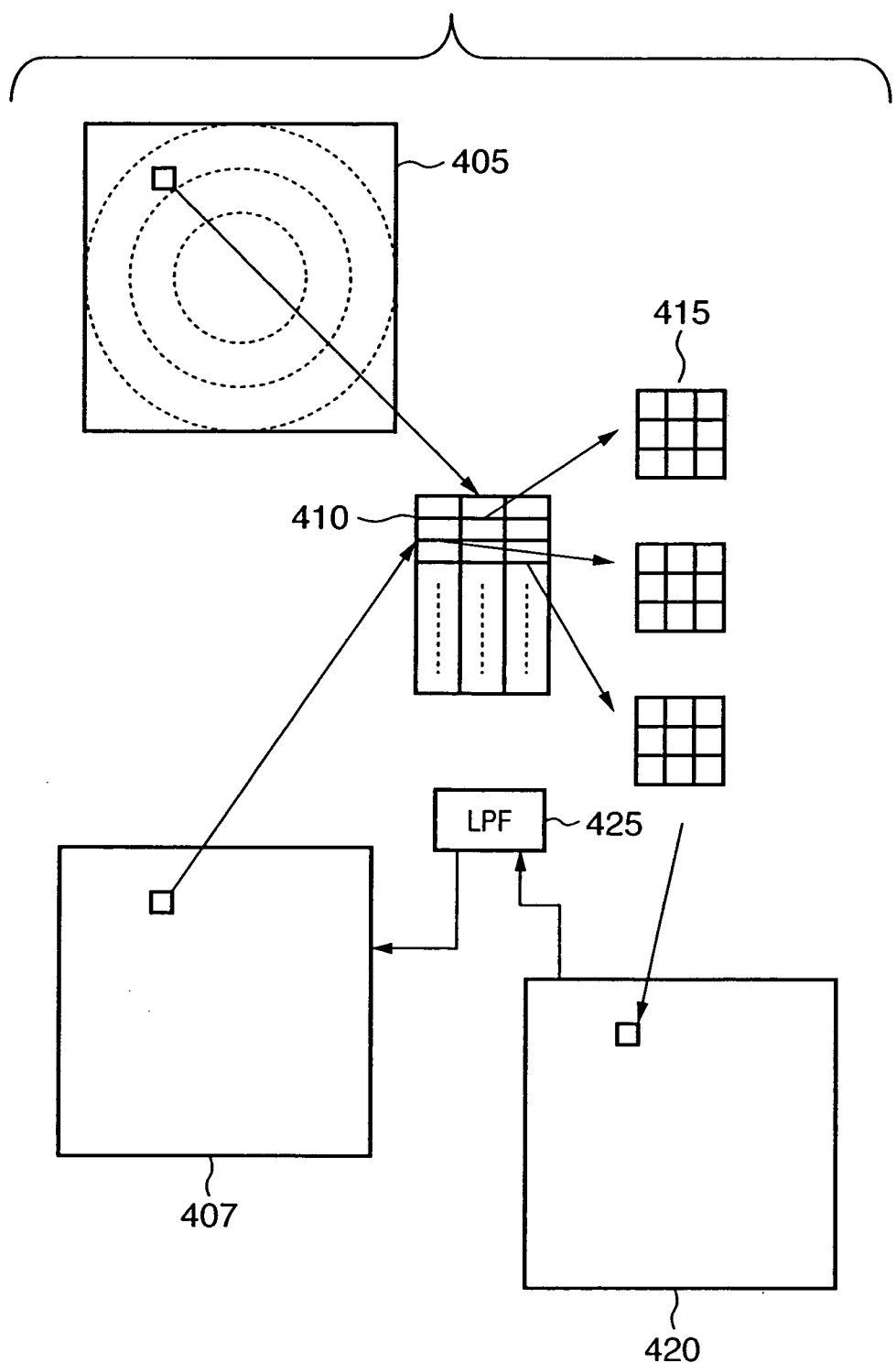
FIG. 4 is a view for explaining sharpening processing according to the second embodiment, which improves a resolution distribution and suppresses noise.

FIG. 4 is a view for explaining sharpening processing according to the second embodiment, which improves the resolution distribution shown in FIG. 2 or 11B. In the first embodiment, a spatial filter is selected in accordance with a resolution distribution as an index. In the second embodiment, a spatial filter is selected in accordance with a resolution distribution and X-ray dose as indexes. Adopting an X-ray dose as an index prevents a deterioration in image quality due to excessive enhancement of X-ray quantum noise.

Referring to FIG. 4, reference numeral 405 denotes resolution distribution data; 407, dose index data; 410, a spatial filter table; 415, a spatial filter; and 420, an original image. The reason why an X-ray dose is used as an index is that as the X-ray dose increases, quantum noise due to X-rays or system noise becomes less conspicuous on an image. This makes it possible to obtain an image with a high S/N ratio (SNR). In a portion where the X-ray dose is high, no noise amplification occurs even with an increase in sharpening strength. In contrast, in a portion where the X-ray dose is low, noise tends to be amplified as the sharpening strength increases.

Referring to FIG. 4, the spatial filter table 410 is formed such that the spatial filter 415 is selected in accordance with two indexes, i.e., a resolution and X-ray dose. The spatial filter table 410 is therefore a two-dimensional table with respect to two indexes, i.e., a resolution and X-ray dose.

The dose index data 407 is data proportional to the X-ray dose incident on an X-ray detector 110, and is generated from a digital X-ray image obtained by imaging which is a target for filtering processing. A digital X-ray image having a pixel value proportional to an X-ray dose may be directly used as the dose index data 407. However, the dose indicated by a pixel value varies depending on noise and a fine structure on the image. In this embodiment, therefore, the data obtained by applying a low-pass filter 425 to this digital X-ray image is used as the dose index data 407.

Referring to FIG. 4, when a pixel position on the X-ray image is determined, a pixel position on the resolution distribution data 405 is determined, and an index of resolution corresponding to the pixel position is determined. By referring to the dose index data 407, an index of dose at the same pixel position is determined. The spatial filter 415 is then selected from the spatial filter table 410 on the basis of the two indexes determined in this manner, i.e., the indexes of resolution and dose. In this case, a spatial filter with a low enhancement degree is selected as the spatial filter 415 at a pixel position where the resolution is high on the X-ray image, and a spatial filter with a high enhancement degree is selected as the spatial filter 415 at a pixel position where the resolution is low as compared with that in the center. In addition, in a portion where the dose is high, a filter with a high enhancement degree is selected. In a portion where the dose is low, a filter with a low enhancement degree is selected.

The spatial filter 415 is selected such that the effect of the filter selected in accordance with two indexes is equivalent to the multiplication between them.

By applying the spatial filter selected in this manner to the original image 420, filtering processing is performed. Performing this operation at all pixel positions on the X-ray image can improve the resolution distribution on the X-ray detector. In addition, according to the second embodiment, since filtering processing is implemented in consideration of the differences in SNR between different X-ray doses, a digital X-ray image without any problem in terms of diagnosis can be obtained without excessive enhancement of noise on the image, e.g., X-ray quantum noise and system noise.

Third Embodiment

Figure 5:
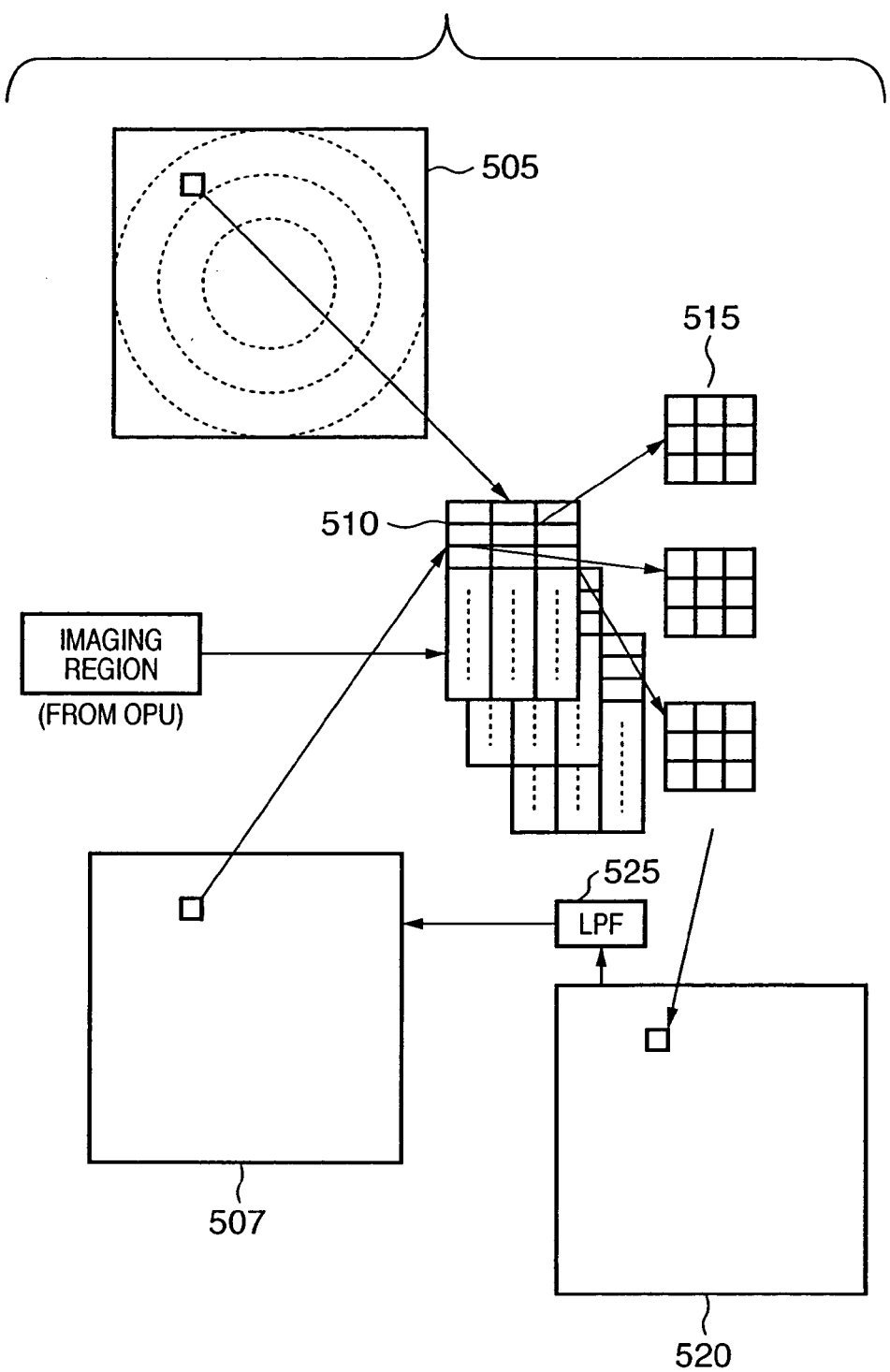
FIG. 5 is a view for explaining sharpening processing according to the third embodiment, which performs sharpening processing of improving a resolution distribution and suppressing noise for each imaging region.

FIG. 5 is a view for explaining sharpening processing according to the third embodiment, which improves the resolution distribution shown in FIG. 2 or FIG. 11A or 11B. In the third embodiment, an imaging region of a subject to be imaged is adopted in addition to the selection criterion for spatial filters which are described in the second embodiment. That is, filtering processing for preventing a deterioration in image quality due to excessive enhancement of X-ray quantum noise is performed in accordance with each imaging region. The reason why filtering processing is changed in accordance with each imaging region is that better results can be obtained by changing the frequency band for enhancement processing depending on the region to be imaged. For example, a digital X-ray image obtained by imaging a bone such as a hand portion or leg portion of the subject contains many important information in a high-frequency region, whereas an image obtained by imaging the thoracic vertebrae or abdominal portion contains many important information in a low-frequency region.

Referring to FIG. 5, reference numeral 505 denotes resolution distribution data; 507, dose index data; 510, a spatial filter table; 515, a spatial filter; 520, an original image; and 525, a low-pass filter. In the third embodiment, the spatial filter 515 is selected in accordance with three indexes, i.e., indexes of resolution, X-ray dose, and imaging region. The spatial filter table 510 is therefore a three-dimensional table which can specify a spatial filter in accordance with three indexes, i.e., indexes of resolution, X-ray dose, and imaging region.

First of all, an imaging region is selected by an OPU 100. By this selection of the imaging region, one of the spatial filter tables 510 separately prepared for the respective imaging regions is selected. The selected single table corresponds to a two-dimensional spatial filter table (having the same arrangement as that of the spatial filter table 410 in the second embodiment). The spatial filter 515 is therefore selected from the two-dimensional spatial filter table corresponding to the imaging region on the basis of a resolution and X-ray dose. The original image 520 is then subjected to filtering processing.

Changing the spatial filter 515 in consideration of the region to be imaged in the above manner makes it possible to optimize sharpening processing for the frequency band of the diagnosis region for each imaging region, thereby effectively supporting diagnosis by the doctor.

The respective dimensions of the three-dimensional spatial filter table 510 described with reference to FIG. 5 correspond to three indexes.

Obviously, however, in practice, one or two of the three dimensions can be arbitrarily selected. For example, a spatial filter may be selected in accordance with a resolution and imaging region, or may be selected from an X-ray dose or imaging region alone. The details of the first to third embodiments will be described below.

[Filtering Processing]

Filtering processing using spatial filters in the first to third embodiments will be described first.

Figure 6:
FIG. 6 is a view for explaining computation for filtering processing according to the first to third embodiments.

FIG. 6 is a view for explaining filtering processing using the spatial filters 315, 415, and 515 described with reference to FIGS. 3 to 5. Referring to FIG. 6, "*" represents convolution. For example, in the case of a 3×3 filter, filtering processing is performed as shown in FIG. 6. By this filtering processing using the 3×3 filter, a pixel value I'(x, y) at each pixel position (x, y) of an image represented by a pixel value I(x, y) is calculated by $$I'(x, y) = \sum_{n=-1}^{1} \sum_{m=-1}^{1} I(x+m, y+n) \times a(m, n) \quad (1)$$

It can be easily speculated that when a filter other than a 3×3 filter is used, only the range of the sums of m and n changes. In this case, a(m, n) corresponds to the spatial filters 315, 415, and 515.

[Frequency Characteristics of Spatial Filters]

The frequency characteristics of the spatial filters used in the first to third embodiments will be described next.

Figure 7:
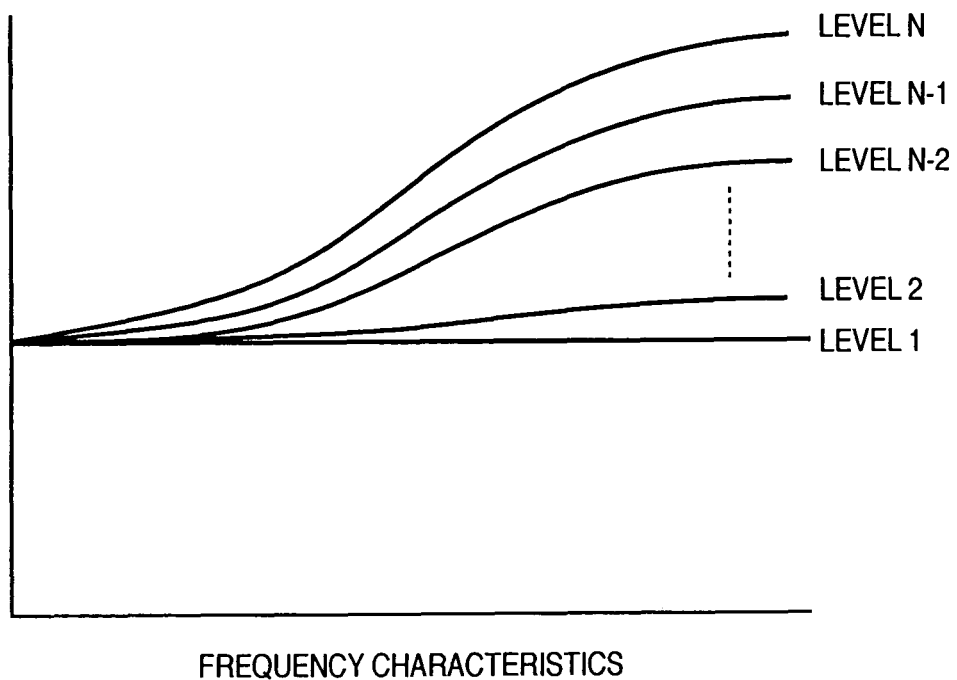
FIG. 7 is a graph for explaining the frequency characteristics of spatial filters according to the first to third embodiments.

FIG. 7 is a view for explaining the frequency characteristics of the spatial filters 315, 415, and 515 used in the respective embodiments described above. The spatial filters 315, 415, and 515 are obtained by Fourier-transforming and sampling the functions of frequency characteristics shown in FIG. 7. That is, the characteristics of the respective spatial filters used as the spatial filters 315, 415, and 515 are determined by the frequency characteristics of the functions shown in FIG. 7 which show one-to-one correspondence with spatial filters.

The functions shown in FIG. 7 increase in high-frequency component from level 1 to level N. This indicates that when filtering processing is performed by using the spatial filters 315, 415, and 515, the high-frequency components of an image are enhanced more strongly from level 1 to level N. In order to obtain the effect of improving the resolution distribution of the X-ray detector 110, therefore, spatial filters may be sequentially selected in increasing order of high-frequency components from level 1 to level N in accordance with the pixel positions at which the resolution gradually decreases. In order to perform enhancement processing suitable for the respective doses without excessively enhancing X-ray quantum noise or system noise, spatial filters may be selected in increasing order of high-frequency components from level 1 to level N with an increase in X-ray dose. In addition, to enhance a diagnosis image containing many higher-frequency components like bones and fine blood vessels, spatial filters may be selected in increasing order of high-frequency components from level 1 to level N.

The above description will be described by using mathematical expressions. Let F(M, X, P) be the function of a frequency domain in FIG. 7. In this case, M represents the value of a presampling MTF; X, a pixel value proportional to an X-ray dose; and P, an imaging region. As M decreases in units of the value of a given frequency while X and P are fixed, F(M, X, P) becomes a function which increases a high-frequency component from level 1 to level N. As X increases while M and P are fixed, F(M, X, P) becomes a function which increases a high-frequency component from level 1 to level N. In diagnosis where P includes many higher-frequency components such as bones and fine blood vessels while M and X are fixed, F(M, X, P) becomes a function which increases a high-frequency component from level 1 to level N.

FIG. 7 shows examples of functions which increase or decrease in all frequency regions. However, functions may be used, in which only a region of frequency components of a given portion monotonously increases or decreases with respect to the respective parameters M, X, and P.

As described above, the resolution distribution of the X-ray detector 110 can be improved by selecting a spatial filter having frequency characteristics in which as the resolution decreases, or the X-ray dose increases, or a diagnosis region includes more fine high-frequency components, a high-frequency component increases from level 1 to level N. In addition, a digital X-ray image can be obtained, which has undergone optimal sharpening processing depending on the imaging region without excessive enhancement of X-ray quantum noise or system noise.

[Flowchart of Image Restoration Processing]

Figure 8:
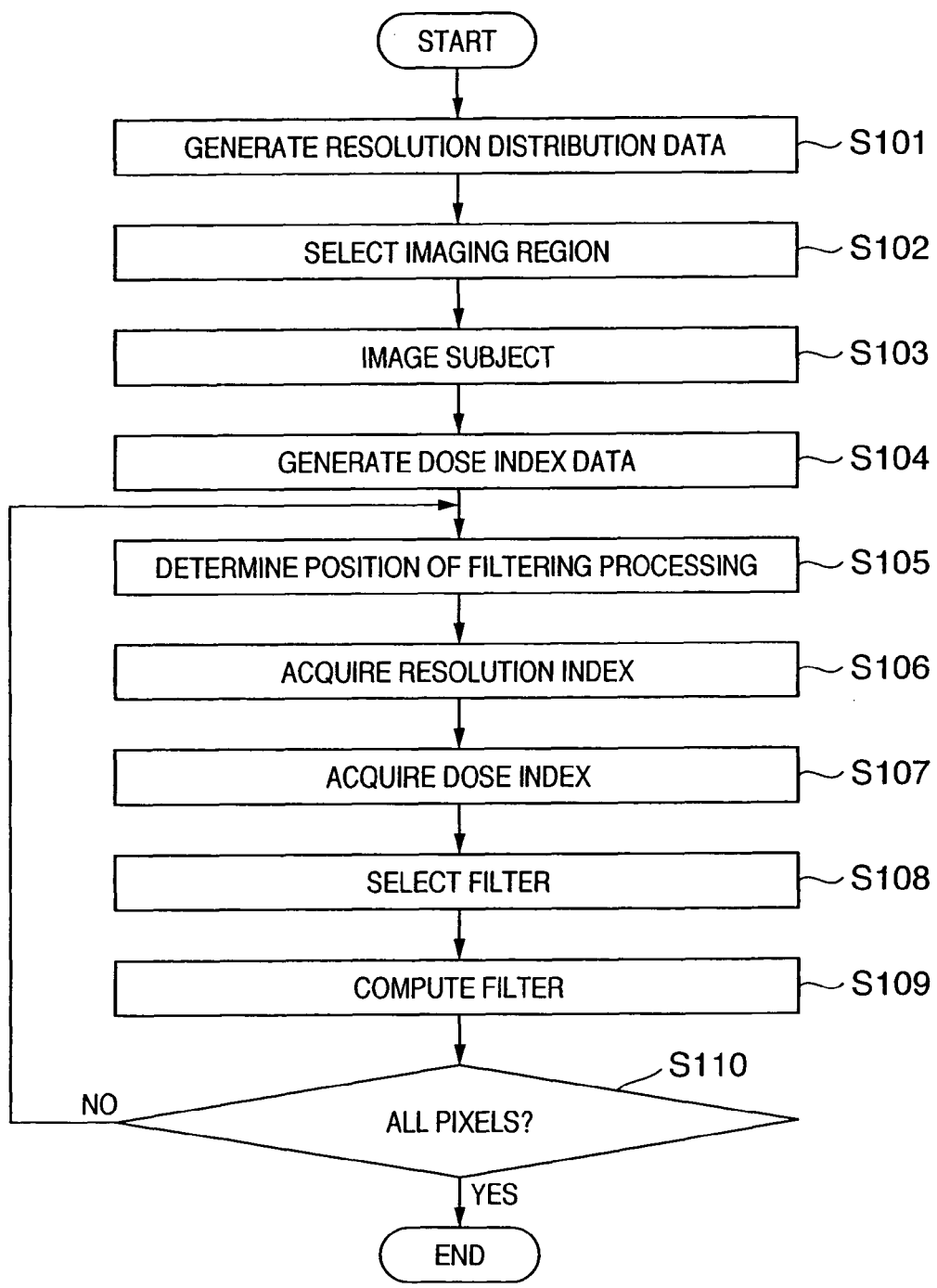
FIG. 8 is a flowchart for explaining image restoration processing according to the third embodiment.

FIG. 8 is a flowchart showing image restoration processing including improving processing for the resolution distribution of the X-ray detector 110, sharpening processing without excessive enhancement of noise, and optical sharpening processing for each imaging region. Processing according to the third embodiment which uses a resolution, X-ray dose, and imaging region to specify a spatial filter will be described. The processing according to the first embodiment is equivalent to the processing shown in FIG. 8 from which the portions associated with an X-ray dose and imaging region are omitted. The processing according to the second embodiment is equivalent to the processing shown in FIG. 8 from which the portion associated with an imaging region is omitted.

In step S101, the resolution distribution data (the resolution distribution data 305, 405, and 505 in FIGS. 3 to 5) of an X-ray detector 110 is generated. The resolution distribution data can be obtained by measuring the presampling MTFs of the X-ray detector 110, as described above. Note that if the measurement value of the resolution distribution data of the X-ray detector 110 is stored, resolution distribution data need not be measured for every imaging operation. In order to also shorten the processing time, it is preferable that resolution distribution data be generated before imaging of the subject and the generated resolution distribution data be stored in an image processing unit 115.

Note that the resolution distribution data may be image data obtained by recording the value of a presampling MTF at a given spatial frequency as a pixel value as shown in FIG. 2. Alternatively, the resolution distribution data may be segmented into concentric regions, as shown in FIG. 3.

In step S102, an imaging region is designated by the OPU 100. In accordance with the information of the imaging region designated in step S102, the corresponding two-dimensional spatial filter table 510 is selected. When an instruction to start X-ray imaging is issued, X-ray imaging of the subject 105 is performed in step S103. More specifically, a digital X-ray image of the subject 105 is acquired from the X-ray detector 110 by irradiation with X-rays from an X-ray source 103.

In step S104, dose index data corresponding to the image obtained by imaging is generated. In this case, the low-pass filter 525 is applied to the digital X-ray original image 520 acquired from the X-ray detector 110 to generate the dose index data 507.

In step S105, the positions of the resolution distribution data 505 of a processing target pixel, the dose index data 507, and the original image 520 are determined. In step S106, a resolution index corresponding to the pixel position determined in step S105 is acquired from the resolution distribution data 505. Likewise, in step S107, a dose index corresponding to the pixel position determined in step S105 is acquired from the dose index data 507. In step S108, the spatial filter 515 corresponding to the resolution index and dose index acquired in steps S106 and S107 are acquired from the spatial filter table 510 corresponding to the imaging region selected in step S102. In step S109, the computation described with reference to FIG. 6 is performed by using the spatial filter 515 selected in step S108. The processing from step S105 to step S109 described above is executed for all the pixels of the image 520 as a processing target (step S110).

With the above processing, a digital X-ray image can be optimally sharpened, thereby providing a digital X-ray image that facilitates diagnosis.

[Application to Restoration Filter]

Figure 9:
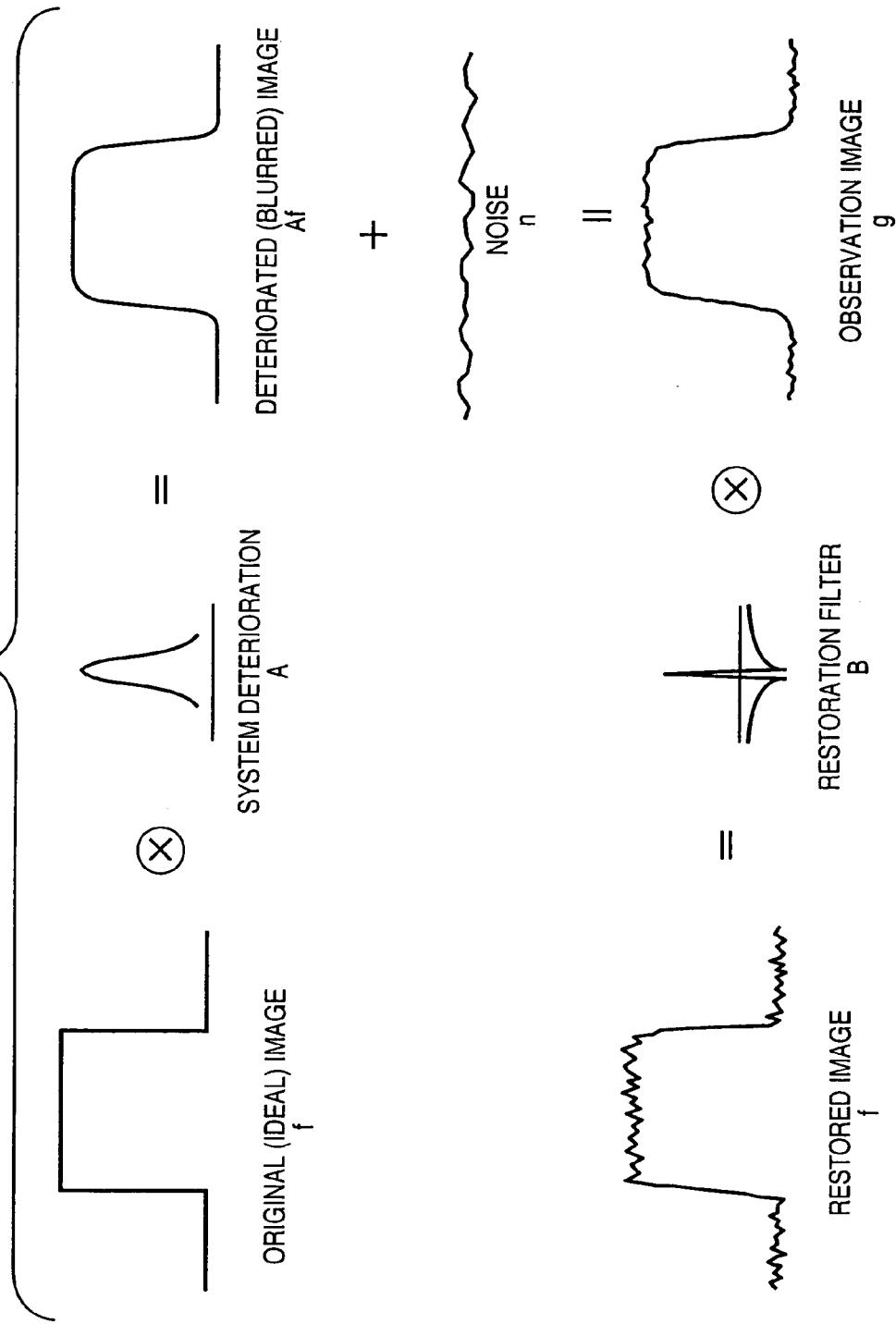
FIG. 9 is a view for explaining how a spatial filter is derived.

A method using restoration filters as the spatial filters 315, 415, and 515 will be described next. FIG. 9 is a view for explaining how an image is restored by a restoration filter. FIG. 9 shows an example of a technique using a restoration filter as a technique of improving resolution deterioration like that shown in FIG. 11B. In this case, the result obtained by Fourier-transforming a PSF (Point Spread Function) representing system deterioration corresponds to the presampling MTF in FIG. 11B.

Assume that an original image (ideal image) (f) has the resolution deterioration (A) described above, and noise (n) such as X-ray quantum noise or system noise produced from a circuit or the like in the apparatus is added to the image to result in acquiring an observation image (g) like that acquired by the X-ray detector 110 as a digital X-ray image. When a restoration filter (B) like the one shown in FIG. 9 is applied to this observation image, a restored image (f') is obtained.

The technique of obtaining a restored image by using this restoration filter is described in detail in, for example; Takagi et al., "Latest Trend of Image Processing Algorithm", New Technology Communications. Restoration filters include a projection filter, homomorphous filter, Wiener filter, and the like. For example, the Wiener filter is given by $$K(\xi, \eta) = \frac{\overline{H(\xi, \eta)}}{|H(\xi, \eta)|^2 + Wn(\xi, \eta)/Wf(\xi, \eta)} \quad (2)$$

where $K(\xi, \eta)$ is the Wiener filter, $Wn(\xi, \eta)$ is the power spectrum of the noise (n) shown in FIG. 9, $Wf(\xi, \eta)$ is the power spectrum of the original image (f) shown in FIG. 9, and $H(\xi, \eta)$ is the presampling MTF of the X-ray detector 110 like that shown in FIG. 11A. As described above, by applying the filter represented by equation (2) or the like to the digital X-ray image, the resolution of the digital X-ray image is improved.

In this case, $Wn(\xi, \eta)$ indicates the power of noise. When this power is normalized by a mean value Mean of the image, $Wn(\xi, \eta)/Mean^2$ is inversely proportional to the square of the SNR of the image dominated by X-ray quantum noise. In addition, $Wf(\xi, \eta)/Mean^2$ corresponds to the power spectrum of the imaged subject which does not depend on the imaging dose, and changes depending on the imaging region. Therefore, $Wn(\xi, \eta)/Wf(\xi, \eta)$ is a parameter dependent on the imaging region and X-ray dose in equation (2). In addition, $H(\xi, \eta)$ is the presampling MTF of the X-ray detector 110. A change in resolution in the X-ray detector 110 corresponds to a change in $H(\xi, \eta)$. That is, in equation (2), $H(\xi, \eta)$ is a parameter which changes in accordance with the resolution distribution in the X-ray detector 110. The functions described with reference to FIG. 7 are expressed by equation (2) in the above manner. By Fourier-transforming and sampling the resultant expressions, the spatial filters 315, 415, and 515 are obtained.

In equation (2), as $K(\xi, \eta)$ increases, the enhancement degree of the processed image increases. Assume that $Wn(\xi, \eta)/Wf(\xi, \eta)$ in equation (2) is interpreted as the division between $Wn(\xi, \eta)/Mean^2$ and $Wf(\xi, \eta)/Mean^2$. In this case, as the X-ray dose increases, $Wn(\xi, \eta)/Mean^2$ decreases, and $K(\xi, \eta)$ increases, resulting in an increase in the enhancement degree of the processed image. In addition, as $H(\xi, \eta)$ in equation (2) decreases, i.e., the resolution of the X-ray detector 110 decreases, $K(\xi, \eta)$ increases, resulting in an increase in the enhancement degree of the processed image. Furthermore, in a subject having less fine structures in which $Wf(\xi, \eta)/Mean^2$ decreases in a high-frequency region, $K(\xi, \eta)$ increases, and the enhancement degree of the processed image increases. As described above, the enhancement processing represented by equation (2) is the processing in which the enhancement degree changes in accordance with the resolution of the X-ray detector 110, an X-ray dose, and an imaging region.

As described above, the spatial filters 315, 415, and 515 described in this embodiment can be realized by using even general restoration filters, and a digital X-ray image optimally sharpened for diagnosis can be obtained.

Equation (2) continuously changes in accordance with the resolution of the X-ray detector 110, an X-ray dose, and an imaging region. However, the spatial filter table 510 may be generated upon discretely setting resolutions, X-ray doses, and imaging regions in advance, and stored in the image processing unit 115. Storing the spatial filter table in advance makes it possible to increase the processing speed. Alternatively, the spatial filters 315, 415, and 515 may be derived from equation (2) at the time of imaging operation.

Although examples of restoration filters have been described above, it is obvious that even edge enhancement filtering processing like unsharp masking processing (Kak Rosenfeld, "Digital Picture Processing", supervised and translated by Makoto Nagao, Kindaikagakusha) can realize similar effects by multiplying a filter by a coefficient which changes depending on a resolution, X-ray dose, and imaging region. Similar effects can be realized by establishing a mathematical expression expressing enhancement processing such that as the X-ray dose increases, the enhancement degree of a processed image increases, whereas as the resolution of the X-ray detector 110 decreases, the enhancement degree of the processed image increases.

[Generation of Resolution Distribution Data]

Figure 10:
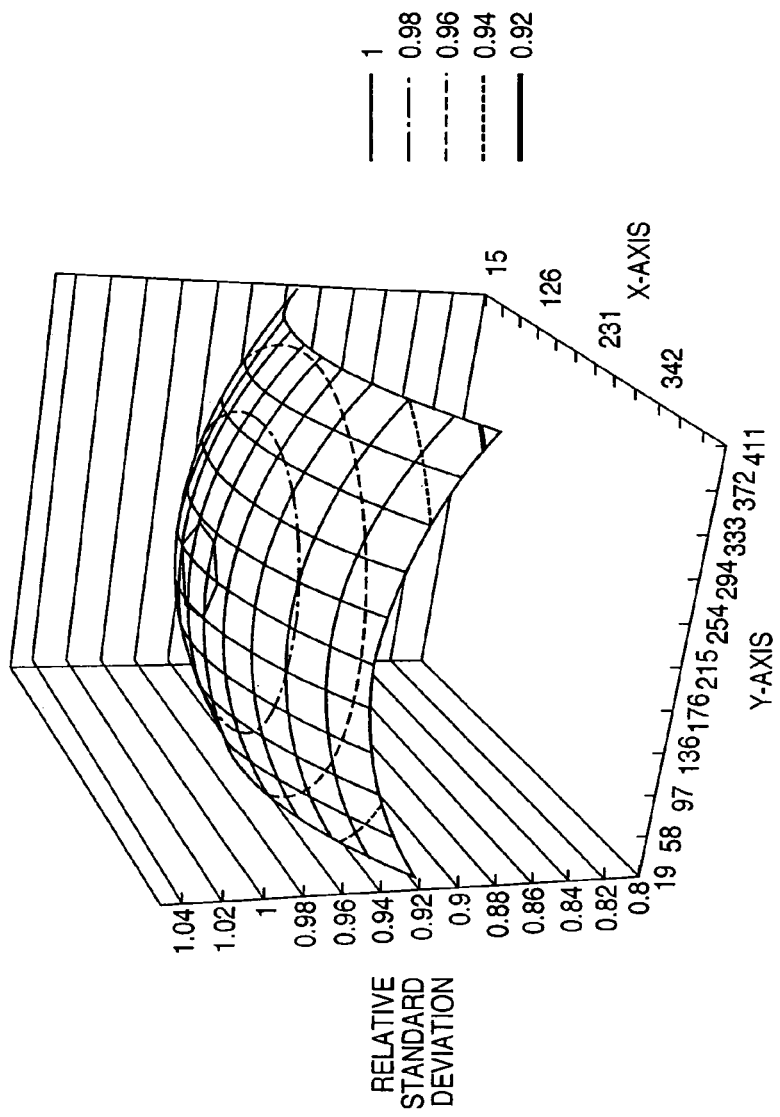
FIG. 10 is a view for explaining the generation of resolution distribution data.

FIG. 10 is a view for explaining one example of a resolution distribution data generating method which can be used in the first to third embodiments.

The graph of FIG. 10 shows the normalized standard deviation distribution of the digital X-ray image acquired from the X-ray detector 110. The standard deviation of a digital X-ray image greatly depends on the resolution if the X-ray dose remains the same. This graph indicates that the standard deviation value decreases concentrically on the digital X-ray image in spite of irradiation with X-rays with a uniform dose. This indicates that the resolution decreases concentrically unless there is no X-ray absorption efficiency distribution. Therefore, this standard deviation and the presampling MTF shown in FIG. 11B have a correlation. For this reason, the resolution distribution of the X-ray detector 110 can be obtained from the standard deviation distribution. That is, the standard deviation distribution of the X-ray dose detected from the X-ray image obtained by performing calibration imaging of the X-ray detector 110 (X-ray imaging without no object between the X-ray detector 110 and the X-ray source 103) at the same tube voltage as that set for imaging of the subject. Since the resolution distribution of the X-ray detector 110 can be estimated from this standard deviation distribution, this standard deviation distribution can be used as resolution distribution data 305, 405, and 505.

Generating the resolution distribution data 305, 405, and 505 by calibration imaging of the X-ray detector 110 can save the labor of measuring presampling MTFs on the entire surface of the X-ray detector 110. This makes it possible to easily generate the resolution distribution data 305, 405, and 505.

The above embodiments will be summarized as follows. According to each embodiment described above, there is provided an image processing method of processing the image obtained by the X-ray detector 110 serving as an image sensor. According to this method, the resolution distribution (305, 405, and 505 in FIGS. 2 and 10) of the X-ray detector 110 is held, a resolution corresponding to a pixel of interest is obtained from the resolution distribution, and sharpening processing at the level selected in accordance with the resolution is executed (image processing unit 115, S106, S108). According to this embodiment, the resolution distribution of the X-ray detector can be improved, and a digital X-ray image suitable for diagnosis can be provided.

In addition, in executing the above sharpening processing, the pixel value of a pixel of interest is obtained by applying the spatial filter (305, 405, or 505) selected in accordance with the resolution.

Furthermore, preferably, as described in the second embodiment, an X-ray dose distribution is acquired on the basis of the image obtained by the X-ray detector 110 (dose index data 407, dose index data 507, LPF 425, LPF 525), and a sharpening processing level is selected on the basis of the resolution obtained from the resolution distribution with respect to the pixel of interest and the X-ray dose obtained from the X-ray dose distribution. According to this embodiment, the resolution distribution of the X-ray detector can be improved, and a digital X-ray image suitable for diagnosis can be provided without excessive enhancement of X-ray quantum noise or system noise.

According to the third embodiment, a sharpening processing level is selected in consideration of the imaging region of the image obtained from the X-ray detector, and hence the resolution distribution of the X-ray detector can be improved, and sharpening processing suitable for the imaging region can be done without excessive enhancement of X-ray quantum noise or system noise, thereby providing a digital X-ray image suitable for diagnosis.

A resolution distribution may also be generated on the basis of the presampling MTF measured with respect to the X-ray detector, or may be acquired on the basis of the standard deviation obtained by uniformly irradiating the X-ray detector with X-rays.

In addition, according to the above embodiment, there is provided the image processing apparatus including the X-ray detector 110 and the image processing unit 115 which holds the resolution distribution of the X-ray detector 110, obtains a resolution corresponding to a pixel of interest of the image obtained by the X-ray detector 110 from the resolution distribution, and executes sharpening processing at the level selected in accordance with the resolution.

Furthermore, according to the above embodiment, there is provided the X-ray imaging apparatus including the X-ray source 103 which emits X-rays, the X-ray detector 110 which detects the X-rays emitted from the X-ray source 103, the image processing unit 115 which holds the resolution distribution of the X-ray detector 110, obtains a resolution corresponding to a pixel of interest of the image obtained from the X-ray detector 110 from the resolution distribution, and executes sharpening processing at the level selected in accordance with the resolution, and the image output unit 120 which outputs the processed image.

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a flexible disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, the image quality of an image obtained from an image sensor having a resolution distribution can be effectively improved.

As many apparently widely different embodiments of the present invention can be made without departing from the spirit and scope thereof, it is to be understood that the invention is not limited to the specific embodiments thereof except as defined in the appended claims.

What is claimed is:

1. An image processing method of processing image data obtained from an X-ray detector having a phosphor plate which converts an X-ray into light, and an image sensor which converts light emitted from the phosphor plate into an electric signal, said method comprising:
   an acquiring step of acquiring a resolution distribution of the phosphor plate;
   an obtaining step of obtaining image data from the X-ray detector; and
   a filter processing step of executing filter processing by applying spatial filters such that a spatial filter is selected as the spatial filter at a pixel position based on a two-dimensional spatial filter table of indexes of resolution and indexes of dose.

2. The method according to claim 1, wherein the obtaining step further filters the image data with a low-pass filter.

3. The method according to claim 1, wherein the filter processing step further generates spatial filter table which associates spatial filters with indexes of resolution based on the correspondence of the position of the pixel to the resolution distribution acquired in the acquiring step and executes the filter processing by using the spatial filter table.

4. The method according to claim 1, wherein the filter processing step further executes the filter processing based on the imaging region in the image data.

5. A non-transitory computer readable storage medium storing a program for causing a computer to perform the image processing method according to claim 1.

6. The method according to claim 1 wherein in the filter processing step, the spatial filter is applied such that: a spatial filter with a low enhancement degree is applied at a pixel position where the resolution is high; a spatial filter with a high enhancement degree is applied at a pixel position where the resolution is low; a spatial filter with a high enhancement degree is applied at a pixel position where the dose is high; and a spatial filter with a low enhancement degree is applied at a pixel position where the dose is low.

7. The method according to claim 1 wherein the two-dimensional space filter table is provided with respect to each imaging region, and
in the filter processing step, the spatial filter is selected based on indexes of resolution, indexes of dose and indexes of imaging region.

8. An image processing apparatus which processes image data obtained from an X-ray detector having a phosphor plate which converts an X-ray into light, and an image sensor which converts light emitted from the phosphor plate into an electric signal, said method comprising:
an acquiring step of acquiring a resolution distribution of the phosphor plate; and
a filter generating step of generating a spatial filter at a position of a pixel, using a two-dimensional spatial filter table which associates spatial filters with indexes of resolution and indexes of dose, based on correspondence of the position of the pixel to the resolution distribution acquired in the acquiring step and X-ray dose at the position of the pixel.

9. A non-transitory computer readable storage medium storing a program for causing a computer to perform the image processing method according to claim 8.

10. The method according to claim 8 wherein in the filter generating step, the spatial filter is generated such that: a spatial filter with a low enhancement degree is applied at a pixel position where the resolution is high; a spatial filter with a high enhancement degree is applied at a pixel position where the resolution is low; a spatial filter with a high enhancement degree is applied at a pixel position where the dose is high; and a spatial filter with a low enhancement degree is applied at a pixel position where the dose is low.

11. The method according to claim 8 wherein the two-dimensional space filter table is provided with respect to each imaging region, and
in the filter generating step, the spatial filter is generated based on indexes of resolution, indexes of dose and indexes of imaging region.

12. An image processing apparatus which processes image data obtained from an X-ray detector having a phosphor plate which converts an X-ray into light, and an image sensor which converts light emitted from the phosphor plate into an electri signal, said apparatus comprising:
an acquiring unit configured to acquire a resolution distribution of the phosphor plate;
an obtaining unit configured to obtain image data from the X-ray detector; and
a filter processing unit configured to execute a filter processing by applying spatial filters such that a spatial filter is selected as the spatial filter at a pixel position based on a two dimensional spatial filter table of indexes of resolution and indexes of dose.

13. The apparatus according to claim 12 wherein the filter processing unit applies the spatial filter such that: a spatial filter with a low enhancement degree is applied at a pixel position where the resolution is high; a spatial filter with a high enhancement degree is applied at a pixel position where the resolution is low; a spatial filter with a high enhancement degree is applied at a pixel position where the dose is high; and a spatial filter with a low enhancement degree is applied at a pixel position where the dose is low.

14. The apparatus according to claim 12 wherein the two-dimensional space filter table is provided with respect to each imaging region, and
said filter processing unit selects the spatial filter based on indexes of resolution, indexes of dose and indexes of imaging region.

15. An image processing apparatus which processes image data obtained from an X-ray detector having a phosphor plate which converts an X-ray into light, and an image sensor which converts light emitted from the phosphor plate into an electric signal, said apparatus comprising:
an acquiring unit configured to acquire a resolution distribution of the phosphor plate; and
a filter generating unit configured to generate a spatial filter at a position of a pixel, using a two-dimensional spatial filter table which associates spatial filters with indexes of resolution and indexes of dose, based on correspondence of the position of the pixel to the resolution distribution acquired by the acquiring unit and X-ray dose at the position of the pixel.

16. The apparatus according to claim 15 wherein the filter generating unit generates the spatial filter such that: a spatial filter with a low enhancement degree is applied at a pixel position where the resolution is high; a spatial filter with a high enhancement degree is applied at a pixel position where the resolution is low; a spatial filter with a high enhancement degree is applied at a pixel position where the dose is high; and a spatial filter with a low enhancement degree is applied at a pixel position where the dose is low.

17. The apparatus according to claim 15 wherein the two-dimensional space filter table is provided with respect to each imaging region, and
said filter generating unit generates the spatial filter based on indexes of resolution, indexes of dose and indexes of imaging region.

* * * * *